Figure 6:
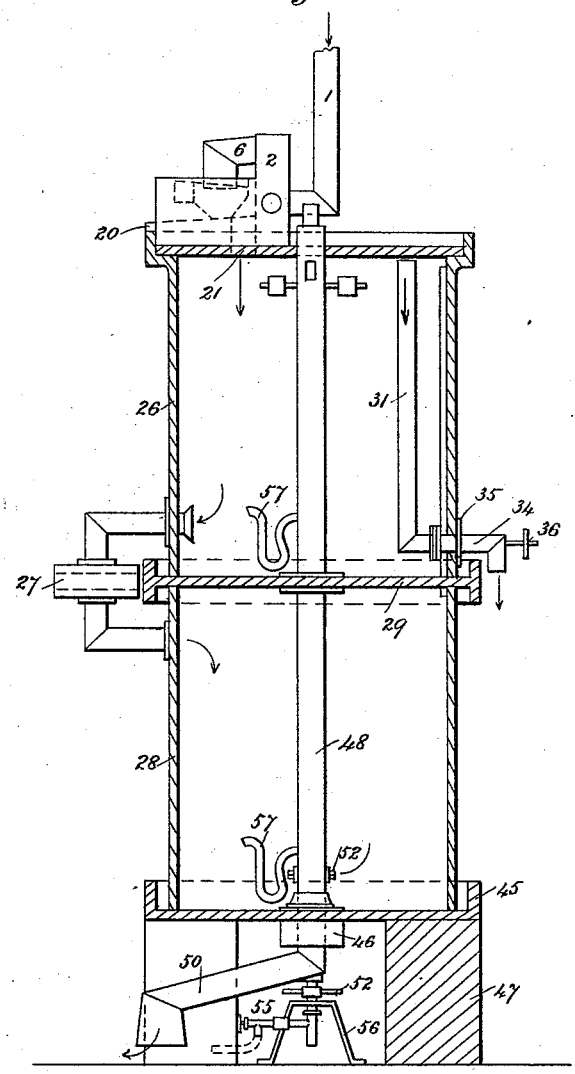

(No Model.) 2 Sheets—Sheet 1.
R. C. SAYER.
APPARATUS FOR UTILIZING RAIN WATER.
No. 422,451. Patented Mar. 4, 1890.
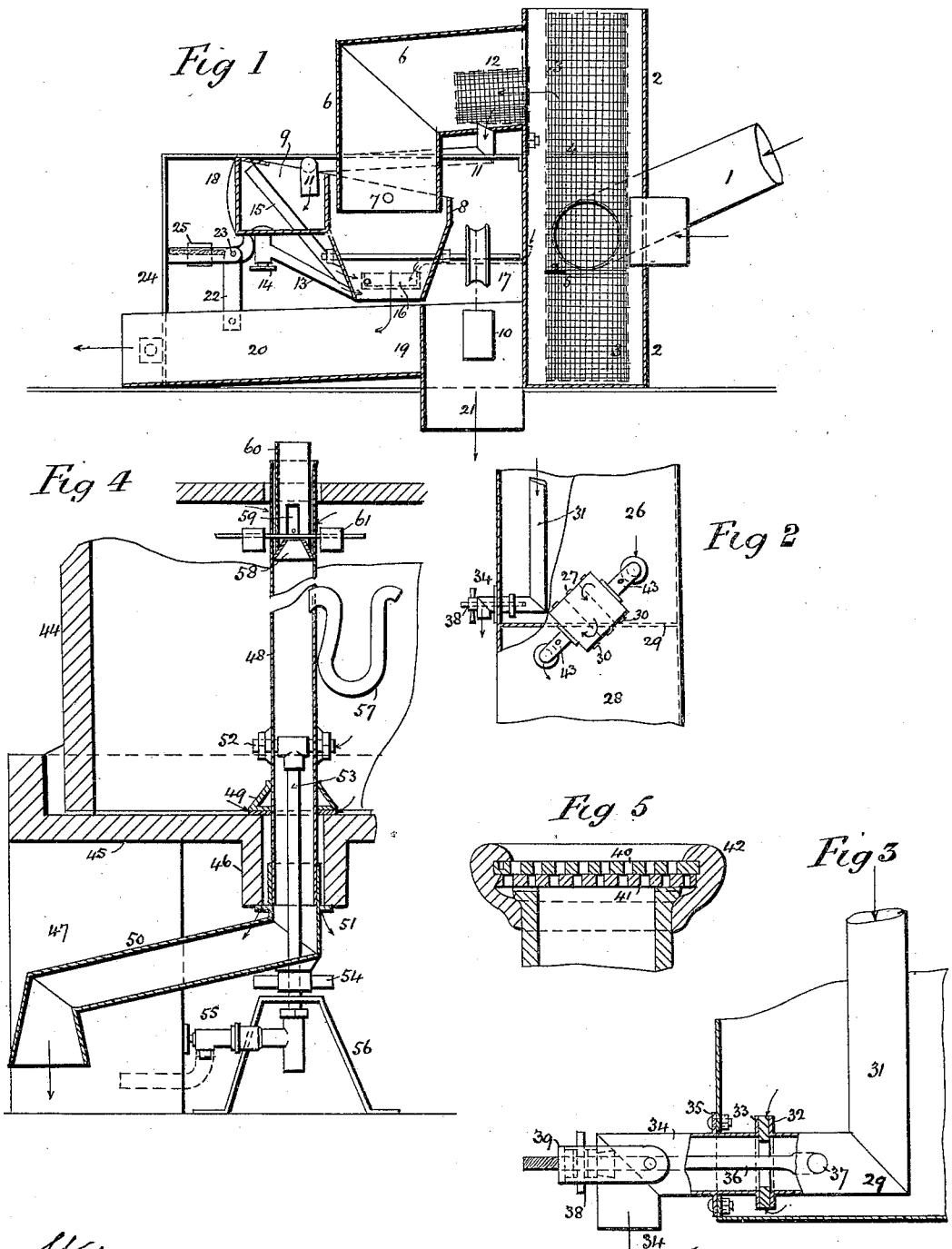
Witnesses:
C. J. Belt
J. Wm. Hister
Inventor
R. C. Sayer
by Herbert W. T. Jenner
Attorney (No Model.) 2 Sheets—Sheet 2.

R. C. SAYER.
APPARATUS FOR UTILIZING RAIN WATER.

No. 422,451. Patented Mar. 4, 1890.

WITNESSES
Walter Allen
F. A. Hopkins

INVENTOR
R. C. Sayer.
by Herbert W. T. Jenner.
Attorney

UNITED STATES PATENT OFFICE.

ROBERT COOKE SAYER, OF REDLAND, BRISTOL, COUNTY OF GLOUCESTER, ENGLAND.

APPARATUS FOR UTILIZING RAIN-WATER.

SPECIFICATION forming part of Letters Patent No. 422,451, dated March 4, 1890.

Application filed May 22, 1889. Serial No. 311,757. (No model.) Patented in England November 29, 1887, No. 16,372, and January 17, 1889, No. 838, and in Germany February 18, 1889, No. 46,185.

*To all whom it may concern:*

Be it known that I, ROBERT COOKE SAYER, a subject of the Queen of Great Britain and Ireland, and a resident of Redland, Bristol, in the county of Gloucester, England, have invented certain Improvements in Apparatus for Utilizing Rain-Water for Domestic Purposes, of which the following is a specification.

Foreign patents have been obtained for this invention as follows: in England, No. 16,372, dated November 29, 1887, and No. 838, dated January 17, 1889, and in Germany, No. 46,185, dated February 18, 1889.

My invention for improvements in apparatus for utilizing rain-water for domestic purposes relates to apparatus for collecting, filtering, and storing the rain-water, and has for its principal objects to provide improved means for straining the water collected from the roofs of houses or other collecting area, for separating the dirty water first collected from the clean water subsequently collected, for storing the water before and during filtration, and for retaining the filtering material in the filter; and it consists in a strainer constructed so as to arrest the buoyant as well as the heavy suspended matter; in causing the stream of water collected to be instantaneously diverted from the waste-trough for storing when the roofs or other collecting area have been cleansed by the first portion of the water, the whole of the water being then collected; in providing the holders or reservoirs in which the water is stored with a combined overflow, flushing, and drawing-off arrangement, which may also serve for heating a portion to enable it to be drawn off and preserving the remainder in the reservoirs from damage by frost, and in a means for retaining the filtering material in the filter, consisting of a sieve having apertures the size of which can be varied with great exactitude in a material that is not perishable and capable of being cleansed without removal. The collected water is first passed through a strainer for retaining the whole of the suspended matter, and a portion then passes to actuate special apparatus hereinafter described, and the remainder passes off to waste. When the roof has been cleansed, the whole of the water collected is instantaneously diverted by the special apparatus above mentioned from the waste to a primary reservoir, whence it passes through a filter to a second reservoir, and thence through a second filter to a third reservoir.

In the accompanying sheets of drawings, Figure 1 is a vertical section of the strainer and apparatus for instantaneously diverting the stream of water. Fig. 2 shows in vertical section the primary and secondary reservoirs with the filter between them. Fig. 3 is a vertical section of the overflow, flushing, and drawing-off arrangement. Fig. 4 is a section of the reservoir for the filtered water, and Fig. 5 shows a section of the sieve for retaining the filtering material in the filter. Fig. 6 is a vertical section through the complete apparatus, showing the connection and co-operation of its various parts.

The water is collected in pipes 1, connected to a cylinder 2, containing a bag of net-work 3, provided internally with plates 4 5, the plate 5 being provided with a hole $a$, as shown. These plates or partitions are formed of imperforate material, and are secured at their edges to the net-work and are supported thereby. The upper plate 4 deflects the particles of dirt, and the lower plate prevents the accumulations of dirt underneath it from being stirred up by any sudden inrush of water. The top of the cylinder 2 is connected to the bent pipe 6, equal in area to the total area of the collecting-pipes 1, and supporting by means of the horizontal spindle 7 the taper pipe 8, carrying the balance-pan 9 and balance-weight 10. The bottom of the horizontal portion of the bent pipe 6 is connected by a small pipe 11 with the balance-pan 9, the inlet being covered by a sieve 12 to prevent any dirt passing to the balance-pan. The bottom of the balance-pan is connected by a pipe 13, provided with a regulating-cock 14, and the top by a pipe 15 to the taper pipe 8. A trough 16 is secured to the side of the taper pipe 8 and communicates with its interior, and a pipe 17 leads out of the cylinder 3, at the height it is desired to empty it, to the trough 16. The balance-pan 9 is provided on its exterior with a radial band 18. Underneath the taper pipe 8 is a trough divided into two parts by a partition 19, the one part 20 leading to the waste and the other 21 to a reservoir or tank. On the trough 20 are mounted two legs 22, supporting on the fulcrum 23 a lever 24, one arm of which is provided with an adjustable balance-weight 25, the other arm normally bearing under the balance-pan and preventing it from tipping.

The water collected in the pipes 1 is received upon the plate 5, the contained dirt being washed through the hole to its under side and held there. Any dirt rising up the cylinder 2 is retained by the plate 4. The water flows through the bag 3 at all points and rises up the cylinder, and a part flows through the bent pipe 6 and taper pipe 8 into the waste-trough 20 and a part through the pipe 11 into the balance-pan 9. The cock 14 regulates the maximum time it takes for the water flowing through the pipe 11 to fill the balance-pan 9, and if the weight 25 is at the outer end of the lever 24 it then falls. By moving the weight 24 toward the fulcrum the time of tipping can be lessened, as required. When the pan is tipped, the whole of the collected water is diverted from the waste 20 to the pipe 21, the water passing into the pan 9, overflowing by the pipe 15 to the taper pipe 8. The pan 9, when depressed, raises the weight 25 vertically over the fulcrum by means of the band 18 and retains it there, the pan 9 descending suddenly. It will thus be seen that the whole of the collected water is diverted suddenly from the waste-pipe 20 to the storage-pipe 21. When the rain ceases, the balance-pan is returned to its normal position by the weight 10.

The water passes by the pipe 21 to the tank 26, and thence through the filter 27 to the tank 28, from which it may be drawn for laundry and other purposes. The tanks 26 and 28 are made as one, with a division-plate 29 between them. The filter 27 is of known construction; but is laid at an angle of forty-five degrees, so that it can readily be cleaned by means of the plugged openings 30.

The tank 26 is fitted with a combined overflow, drawing-off, and flushing arrangement, the bent overflow-pipe 31 having a flange 32 abutting against the flange 33 of a bent pipe 34, passing through the side of the tank and fixed thereto by the flange 35. An elastic packing-ring is inserted between the flanges 32 and 33. The two pipes 31 and 34 are secured together by means of the spindle 36, having a cross-piece 37 attached to the pipe 31, and a nut 38, bearing against the pipe 34 and loop 39. The overflow passes off by the pipes 31 and 33. The flushing or drawing off is effected by unscrewing the nut 38, when the water rushes out between the flanges 32 and 33 and by the pipe 34.

From the tank 28 the water is passed through a filter of known construction into the tank shown in Fig. 4, to be used for drinking or other purposes. In order to keep the filtering medium in the filters, a sieve of peculiar construction is employed, by which the size of the apertures can be accurately regulated. They are made of two or more plates 40 41, of carbon, slate, or other suitable material, and are drilled so as to accurately coincide with one another. One is then slid upon the other, so as to adjust the apertures to the required size. A number of diagonal holes are then made in the plates 40 41, into which dowels are inserted to keep them in position until fixed in the filter. The plates are fixed by means of cement 42, as shown. Immediately above and below the plates are small plugged openings 43, for inserting a syringe to cleanse them.

The tank for holding the drinking-water is formed of earthenware socket-pipes 44, cemented together, one above the other, vertically to any desired height. The base 45 of the tank is provided with an exit 46, and is supported upon brick-work 47. The tank is provided with a central pipe 48, passing through and resting upon its bottom by the flange 49 and passing through the exit-opening 46. A bent pipe 50, having a bell-mouth at its lower end, passes over the bottom end of the pipe 48, and snugs 51, near its upper end, bear against the under side of the exit-opening 46. A small cross-pipe 52 passes across the pipe 48, as shown, and is connected to the pipe 53, carrying the nut 54 and draw-off tap 55, and passes through the support 56. The pipe 48, at certain heights, carries mercurial siphons 57, where the head of water is not too great, or spring-valves opening into the pipe 48, which allow the contents to expand with frost. The pipe 48 also carries a cone 58 and has four openings 59. A short inner sleeve-tube 60, extending beyond the top of the tank, normally rests upon the cone 58, and is connected to the floats 61.

The overflow is carried off through the openings 59 and pipes 48 and 50 when the water rises sufficiently to raise the floats 61. The water is drawn off through the pipes 52 and 53 and tap 55. The sediment is flushed out by loosening the nut 54, which then bears upon the top of the support 56 and forces the pipe 48 upward. The water then rushes out in volume between the pipe 48 and exit-opening 46 in the direction of the arrows. In order to keep the center of the water available for use during frost a heated gas is passed through the pipes 50 48.

I claim as my invention and desire to secure by Letters Patent—

1. The combination, with the upper tank 26 and the lower tank 28, provided with an outlet-pipe, of the filter provided with pipes connecting it with the two said tanks, a separate overflow-pipe in each tank, the clean-water pipe 21, and the dirty-water chute 20, supported above the upper tank, and oscillating vessel pivoted over said pipe and chute, the pipe 6, delivering rain-water into said vessel, and the small pipe 11, connected to said pipe 6, whereby said vessel may be caused to oscillate, substantially as and for the purpose set forth.

2. The combination, with the vertical strainer provided with an upper partition, and a lower partition having a hole in it, of the tank inclosing said strainer and provided with an outlet at its upper part, and an inlet-pipe projecting through the side of said tank and delivering the rain-water through the strainer side onto the said lower partition, substantially as set forth.

3. The combination, with the pipe 6, of the pipe 8, pivoted on pin 7 and provided with the balance-pan 9 upon one side of it and adapted to oscillate therewith upon the said pin, the adjustable outlet-valve and pipe 13, connecting the bottom of said pan with pipe 8, and the small pipe 11, connecting pipe 6 with the balance-pan, substantially as and for the purpose set forth.

4. The combination, with the pipe 6, of the pipe 8, pivoted on pin 7 and provided with the balance-pan 9, having the band 18 on its side, the pivoted lever provided with a sliding weight and with a projecting end normally bearing against the under side of the balance-pan and bearing against said band 18 when the pan is overbalanced, and the small pipe 11, connecting pipe 6 with the pan, substantially as and for the purpose set forth.

5. The combined overflow, flushing, and drawing-off apparatus, consisting of elbow-pipe 34, secured to the tank, pipe 31, forming a continuation of pipe 34 and passing upward to the top of the tank, a spindle attached to pipe 31 and passing out of the tank through pipe 34, and an adjustable fastening device supported on the end of pipe 34 and engaging with the projecting end of said spindle, whereby the joint between the said pipes may be made or broken, substantially as and for the purpose set forth.

In witness whereof I have hereunto set my hand in the presence of two witnesses.

ROBERT COOKE SAYER.

Witnesses:
JOHN H. CLARKE,
STEPHEN APPLEGATE.